United States Patent [19]

Ogawa et al.

[11] Patent Number: 4,474,462

[45] Date of Patent: Oct. 2, 1984

[54] VARIABLE MAGNIFICATION TYPE OPTICAL COPIER IN WHICH THE COPYING SIZE CAN BE INCREASED OR DECREASED

[75] Inventors: Ryota Ogawa; Yasunori Arai, both of Saitama, Japan

[73] Assignee: Asahi Kogaku Kogyo Kabushiki Kaisha, Tokyo, Japan

[21] Appl. No.: 561,143

[22] Filed: Dec. 14, 1983

Related U.S. Application Data

[63] Continuation of Ser. No. 311,726, Oct. 15, 1981, abandoned.

[30] Foreign Application Priority Data

Oct. 18, 1980 [JP] Japan ............................... 55-145988

[51] Int. Cl.[3] .............................................. G03B 27/34

[52] U.S. Cl. ......................................... 355/60; 355/57

[58] Field of Search ........................ 355/55, 56, 57, 60; 350/423, 426

[56] References Cited

U.S. PATENT DOCUMENTS 3,880,498 4/1975 Liu et al. ............................ 350/426
4,172,635 10/1979 Ogino ................................ 350/426
4,304,466 12/1981 Betensky ............................ 350/426
4,333,711 6/1982 Itoh et al. ............................ 350/426

OTHER PUBLICATIONS

The Focal Encyclopedia of Photography, The Macmillan Company, New York, 1960, pp. 1247-1248.

*Primary Examiner*—Monroe H. Hayes
*Attorney, Agent, or Firm*—Sughrue, Mion, Zinn, Macpeak, and Seas

[57] ABSTRACT

In an optical copier having a zoom lens, the first and second lens groups are positive and negative, respectively, to provide sufficient movement range for the half-speed mirrors.

3 Claims, 10 Drawing Figures

VARIABLE MAGNIFICATION TYPE OPTICAL COPIER IN WHICH THE COPYING SIZE CAN BE INCREASED OR DECREASED

This application is a continuation of application Ser. No. 311,726, filed Oct. 15, 1981 now abandoned.

BACKGROUND OF THE INVENTION

This invention relates to an improvement in a variable magnification type optical copier in which the copying size can be increased or decreased as desired.

A conventional variable magnification type optical copier, such as shown in FIG. 1, is disclosed in U.S. patent application Ser. No. 244,476 filed Mar. 16, 1981. Briefly, the optical copier operates as follows. An original placed on a contact glass 2 on the top of the copier is illuminated by a light source 3 which reciprocates between a standby position A and a finish position B to scan the original. Upon illumination of the original, light reflected from the original is received by a full-speed mirror 6 which moves with the light source 3, and is introduced through half-speed mirrors 7 and 8 (in general, the half-speed mirrors 7 and 8 move in such a manner that the amount of displacement thereof is half of the amount of displacement of the full-speed mirror 6 in order to maintain constant an object-to-image distance for zoom lens system 9 described later) to the zoom lens system 9 incorporated in a variable magnification device 11. The reflected light thus introduced exits after being subjected to magnification variation by the zoom lens system 9 which has been moved for a specified magnification factor. Then, the reflected light is reflected by a stationary mirror 10 so as to be applied to a photo-sensitive drum 13. As a result, a magnified electrostatic latent image of the original is formed on the photosensitive drum 13. Therefore, the image is recorded in a conventional electrostatic recording process.

In such a copier, the movement region of the zoom lens system 9 overlaps the movement region of the half-speed mirrors 7 and 8. Therefore, in enlarging the image of the original, the zoom lens system 9 must be set close to the half-speed mirrors, i.e., it is moved to the left in FIG. 1 for purposes of enlargement, and accordingly the movement region of the half-speed mirrors is necessarily decreased. In the case where a copying image to be enlarged is close to the maximum original size of the optical copier, i.e. both the image size and the original size are large, several disadvantages result. For instance, if an original of size "A4" is enlarged into an image of size "A3" by a copier whose maximum permissible original size is "A3", with the longer side of the maximum copying original size as a reference as shown in FIGS. 2(*a*) and 2(*b*), and if the original 22 of size "A4" is set vertically as shown in FIG. 2(*a*), then the half-speed mirrors 7 and 8 can move without contacting the zoom lens system while maintaining the object-to-image distance constant, because the scanning distance of the full-speed mirror 6 is only half of the longitudinal length of size "A3". However, as the image is enlarged uniformly in all directions, including in the widthwise direction of the drum 13, a part of the image exceeds the size of the drum 13 as indicated by the phantom line; that is, this part of the image is not formed on the drum. On the other hand, if the original is set horizontally as shown in FIG. 2(*b*), then the amount of necessary movement of the half-speed mirrors 7 and 8 is increased to the point where they are interfered with by the zoom lens 9. Therefore, it is impossible to obtain the movement region of the half-speed mirrors which is sufficient for enlarging size "A4" into size "A3", and the image of the original is copied only on a part of the size "A3", as shown in FIG. 2(*b*).

In order to overcome this drawback, the width of the drum must be increased. Alternatively, the enlarging must be limited to size "A5" or "A4" although the copier can copy the image of an original of size "A3".

SUMMARY OF THE INVENTION

The present invention is intended to eliminate the above-described difficulty accompanying a conventional optical copier. In this invention, the zoom lens system comprising two lens groups which are moved along the optical axis extended from the original side towards the drum side is replaced by a telephoto lens system which is made up of a front lens group having a positive focal length and a rear lens group having a negative focal length, as viewed from the original side. As a result, the movement region of the half-speed mirrors is increased towards the zoom lens with the object-to-image distance maintained unchanged, to solve the above-described problem.

BRIEF DESCRIPTION OF THE DRAWINGS

One embodiment of this invention will be described with reference to the accompanying drawings, in which.

DETAILED DESCRIPTION OF THE INVENTION

Figure 1:
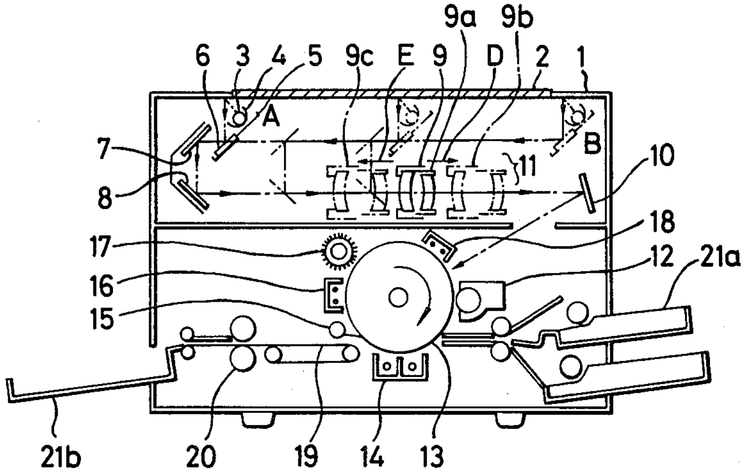
FIG. 1 is an explanatory diagram showing one example of a copier to which the technical concept of this invention is applied.

The subject matter of the invention resides in a zoom lens incorporated in a variable magnification device, and accordingly the remainder of the optical copier is similar to a conventional optical copier. However, for a full understanding of the invention, one example of the arrangement of the optical copier will be described with reference to FIG. 1.

A contact glass 2 is laid on the front of a body frame 1. An original placed on the contact glass 2 is illuminated by an illuminating device 5 which reciprocates between a standby position A and a finish position B to scan the original. The illuminating device 5 comprises:

a lamp 3, a reflecting mirror 4, and a full-speed mirror 6 for reflecting the image of the original, all of which are mounted on one member so as to move as one unit. Light from the original, being reflected by the full-speed mirror 6, is applied to half-speed mirrors 7 and 8. The light thus applied is reflected by the half-speed mirrors 7 and 8 so that it advances to a zoom lens system 9 incorporated in a variable magnification device 11. The light emerging from the zoom lens system 9 is reflected by a stationary mirror 10 and applied to a photo-sensitive drum 13. As a result, an electrostatic latent image is formed on the photo-sensitive drum 13.

The latent image on the drum 13 is developed by a developing device 12. The image thus developed is transferred onto a copying sheet, which is supplied from a sheet supplying device 21*a*, with the aid of a transfer charger 14. The copying sheet is separated from the photo-sensitive drum 13 by a separating pawl 15 and is then delivered to a fixing device 20 by a sheet conveying device 19. The copying sheet, after being fixed by the fixing device 20, is delivered to a sheet discharging cassette 21*b*.

The photo-sensitive drum 13 which has passed by the transfer charger 14 is discharged by a discharging charger 16 and is then cleaned by a cleaning device 17. The drum 13 thus cleaned is charged by a charging charger 18, so that it is ready for forming the next latent image. The above-described operations are repeatedly carried out.

Through the above-described steps, the image of the original on the contact glass 2 is formed on the photo-sensitive drum 13 by the scanning operation of the illuminating device 5, and the image is transferred onto the copying sheet by the developing and transferring actions. In the exposure scanning operation of the illuminating device, the half-speed mirrors 7 and 8, being mounted on respective members, move as one unit in synchronization with the scanning movement of the illuminating device 5. In this connection, the half-speed mirrors 7 and 8 are so designed that they move at a suitable speed, which is usually half (½) of the speed of the illuminating device 5, so as to maintain constant the optical path length from an original illumination position to the zoom lens system 9, and the movement region of the zoom lens system in the copying operation does not overlap the scanning movement region of the half-speed mirrors in the life-size copying operation or in the reduction copying operation.

Figure 3A:
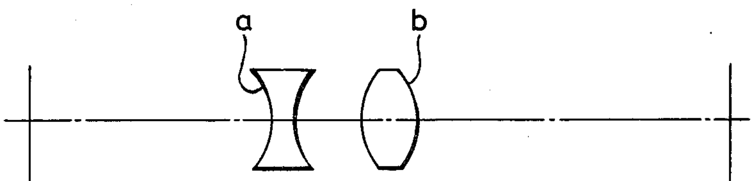
FIG. 3(*a*) is a diagram showing a conventional zoom lens system while FIG. 3(*b*) shows a system according to the invention.
Figure 3B:
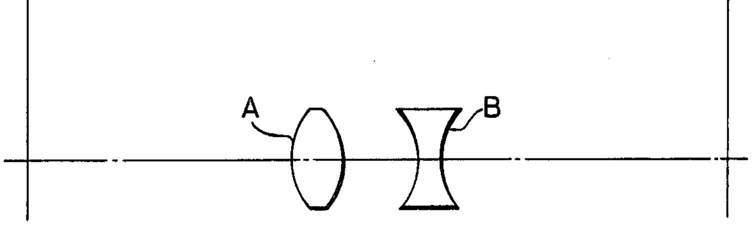

Now, the zoom lens system incorporated in the magnification varying device in the above-described optical copier will be described. FIG. 3(*a*) shows a conventional zoom lens system. The zoom lens system comprises two lens groups which move along the optical axis which is extended from the original side (the left-hand side in the figure) to the drum side (the right-hand side in the figure). The front lens group a, as viewed from the original, has a negative focal length, and the rear lens group b has a positive focal length.

The zoom lens system of the invention is similar to the conventional zoom lens system in that it has two lens groups which move along the optical axis extended from the original side to the drum side; however, it is different in that it is of a telephoto type in which the front lens group A, as viewed from the original side, has a positive focal length and the rear lens group B has a negative focal length.

Figure 4:
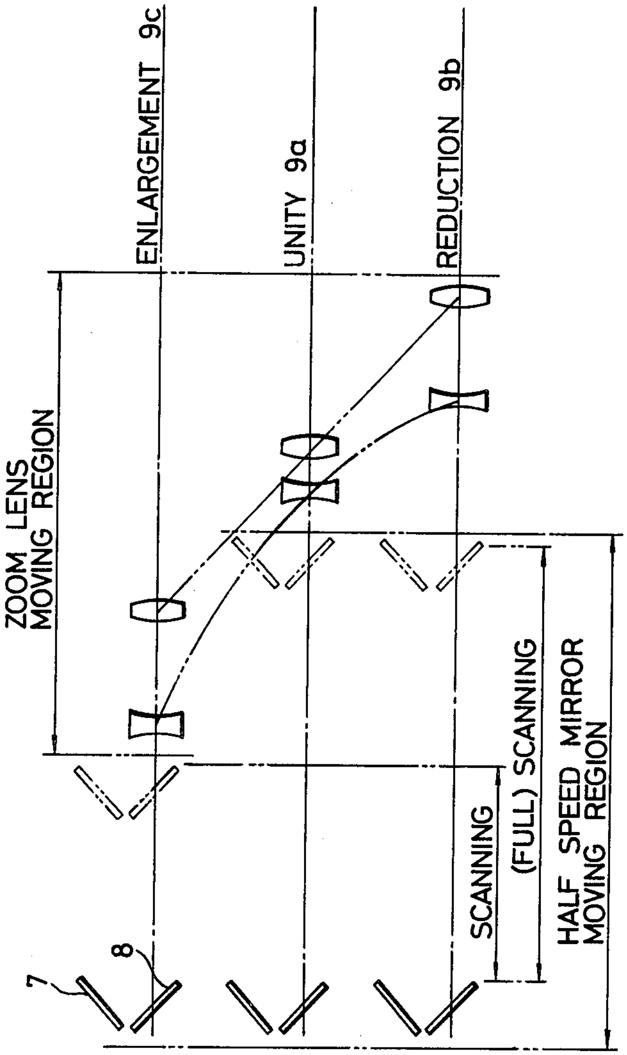
FIG. 4 is an explanatory diagram showing the relationship between the movement of half-speed mirrors and the movement of a prior art zoom lens system.

Let us consider the case where the image of an original is varied in magnification with the above-described zoom lens systems. With the conventional zoom lens, when the lens groups of the zoom lens system are moved separately from the life-size position 9*a* to the enlargement position 9*c* along the optical axis as shown in FIG. 4, the front lens group having the negative focal distance comes excessively close to the half-speed mirrors, as a result of which the permissible movement region of the half-speed mirrors is decreased. Thus, the difficulty described in the introductory part of the specification is caused.

Figure 5:
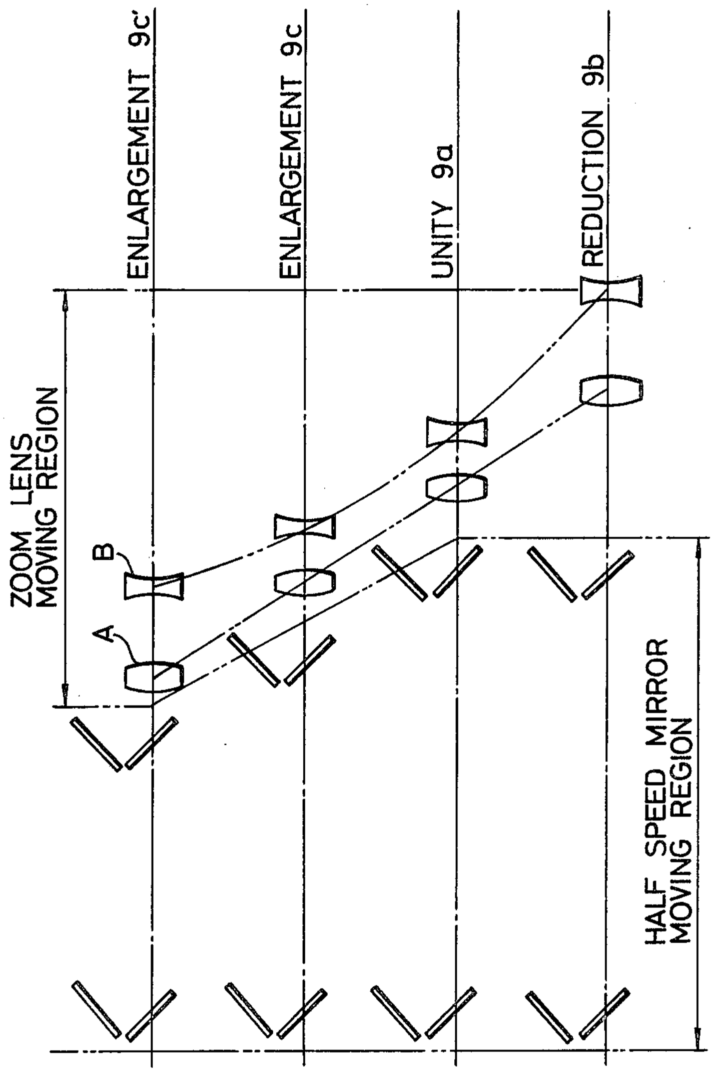
FIG. 5 is an explanatory diagram showing the relationship between the movement of half-speed mirrors and the movement of the zoom lens system according to this invention.

On the other hand, such a difficulty is not caused with the zoom lens system of the invention. When the zoom lens system according to this invention is moved from the life-size position 9*a* to either of the enlargement positions 9*c* and 9*c*', the amount of movement of the front lens group A towards the half-speed mirrors is smaller than that of the front lens group in the conventional zoom lens system as shown in FIG. 5 and accordingly the movement region of the half-speed mirrors is not decreased as much.

Figures 2A, 2B, 2C:
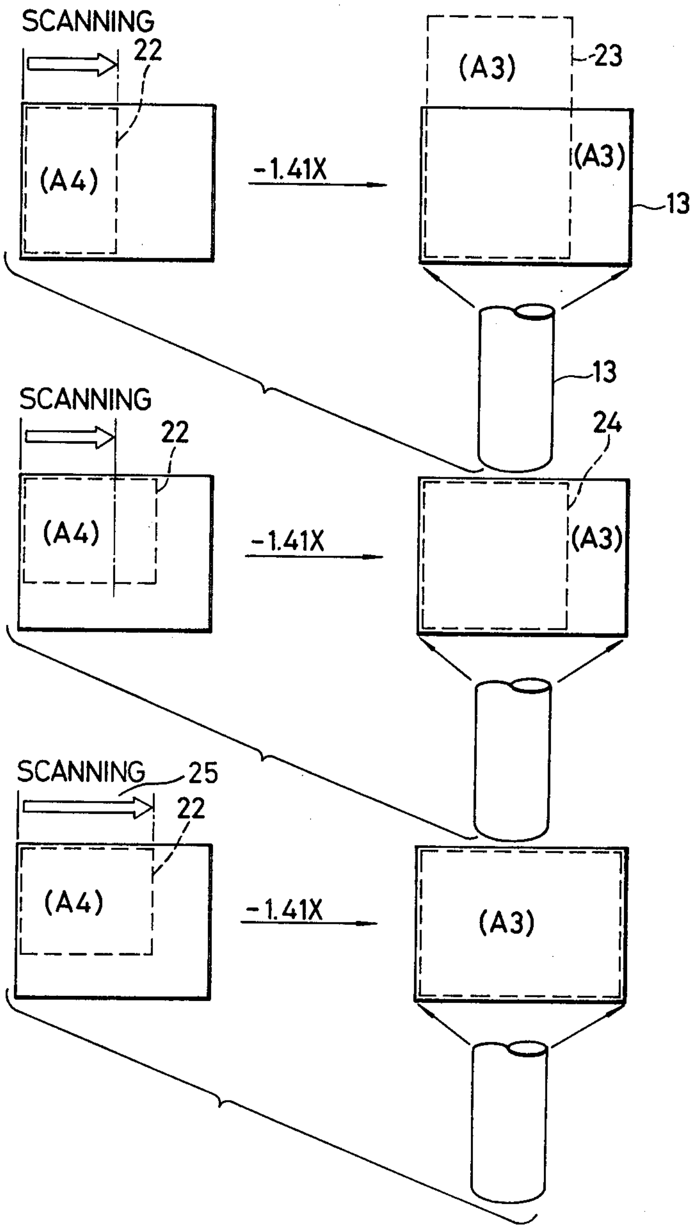
FIGS. 2(*a*)–2(*c*) are explanatory diagrams for a description of the comparison of the prior art with the invention, showing originals before and after they are subjected to variable magnification copying, maximum original sizes allowable for copying the originals and a photo-sensitive drum's unfolded size.

Let us consider the case where, as shown in FIG. 2(*c*), in order to increase the size of an original 22 of size "A4" to size "A3" with an optical copier having a maximum original copying size "A3", the light source scans in the longitudinal direction 25 of the original 22. The longer side of size "A4" is 71% of the longer side of size "A3". Therefore, the movement region of the half-speed mirrors with the conventional zoom lens system is insufficient to allow the scanning operation with the object-to-image distance maintained unchanged, because the permissible movement region is usually only 50% of the long side of size "A3" as shown in FIG. 4. On the other hand, with the zoom lens system of this invention, the image of the same original can be formed fully over the width of the "A3 " size drum. In other words, for a size "A3" paper having a long dimension of 420 mm, the normal range of movement of the half-speed mirrors would be 210 mm. Since the length of "A4" size paper is 71% of the "A3" length, or 298.2 mm, the half-speed mirrors would have to move half of that, or 149.1 mm, in order to scan the complete "A4" paper. However, with the normal 210 mm range of permissible half-speed mirror movement cut by 50% as shown in FIG. 4 for a conventional arrangement, the half-speed mirrors can only move 105 mm, which is 44.1 mm less then the required scanning region, thereby resulting in a loss of 88.2 mm of the resulting "A3". With the telephoto-type zoom lens according to the present invention, the movement region of the half-speed mirrors is never cut to below the size necessary for complete scanning of the image. In general, the object-to-image distance of the above-described zoom lens system is about 1000 mm, and therefore the additional 44.1 mm of half-speed mirror movement range needed in the conventional system is about 4 to 5% of the object-to-image distance. Even if the effect of reversing the lenses according to the present invention is only to increase the movement range on the order of 30 mm, taking it into consideration that some additional space can be provided through other design considerations, a space increase on the order of 30 mm will sufficiently increase the amount of movement of the half-speed mirrors which is permissible without contacting the zoom lens system if the telephoto type zoom lens system of the invention is used.

Figure 6:
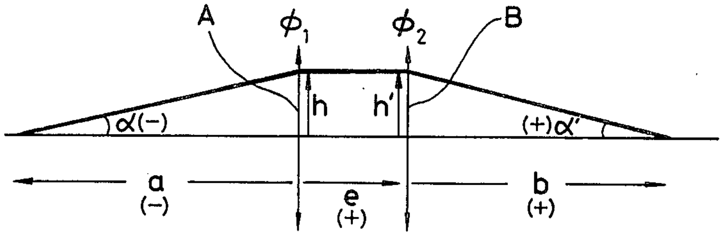
FIG. 6 is a diagram showing the image formation of the zoom lens system according to the invention.

This will now be explained mathematically. As shown in FIG. 6, an object point, a front lens group A having a power $\emptyset_1$, a rear lens group B having a power $\phi_2$ and an image point are provided on the optical axis in the stated order from the left-hand side. The object point is at a distance a from the front lens group A and on the left-hand (minus) side of the lens group A. The rear lens group B is at a distance e from the front lens group A and on the right-hand (plus) side of the group A. The image point is at a distance b from the rear lens group B and on the right-hand (plus) side of the group B. It is assumed that a light beam emerging from the object point at an angle $\alpha$ (minus) enters the front lens group at a height h, and that the light beam thus entering, after being refracted, leaves the rear lens group at a height h' and advances to the image point at an angle $\alpha'$ (plus). In this case, the following relationship holds:

From the image forming formula, $$\begin{pmatrix} h' \\ \alpha' \end{pmatrix} = \begin{pmatrix} A & B \\ C & D \end{pmatrix} \begin{pmatrix} h \\ \alpha \end{pmatrix} \tag{1}$$

where $$A = 1 - e\phi_1$$

$$B = -e$$

$$C = \phi_1 + \phi_2 - e\phi_1\phi_2$$

$$D = 1 - e\phi_2 \tag{2}$$

From FIG. 6, $$a = h/\alpha \tag{3}$$

$$b = h'/\alpha' \tag{4}$$

If the image forming magnification of the entire optical system is represented by m, then $$m = \alpha/\alpha' \tag{5}$$

From the expression (1), $$h' = Ah + B\alpha \qquad (1)'$$

$$\alpha' = Ch + D\alpha \qquad (1)''$$

From the expressions (1)' and (1)'' and the expressions (3), (4) and (5), $$+a = (1/m - D)/C \qquad (3)'$$

$$b = (A - m)/C \qquad (4)'$$

By inserting the expression (2) into the expressions (3)' and (4)', the following expressions (6) and (7) are obtained:

$$-a = (-1/m + 1 - e\phi_2)/(\phi_1 + \phi_2 - e\phi_1\phi_2) \tag{6}$$

$$b = (-m + 1 - e\phi_1)/(\phi_1 + \phi_2 - e\phi_1\phi_2) \tag{7}$$

Therefore, from the expressions (6) and (7), the distance between the object point and the image point (which has been referred to as "the object-to-image distance") is:

$$-a + e + b = \{2 - e(\phi_1 + \phi_2) - 1/m - m\}/(\phi_1 + \phi_2 - e\phi_1\phi_2) \tag{8}$$

The value of the right side of the expression (8) is unchanged even if $\phi_1$ and $\phi_2$ are interchanged. That is, even if the powers of the front and rear lens groups are replaced by each other, the object-to-image distance is maintained unchanged. However, when $\phi_1$ and $\phi_2$ are replaced by each other, with respect to the distance a only, the numerator is changed as follows:

$$-a' = (-1/m + 1 - e\phi_1)/(\phi_1 + \phi_2 - e\phi_1\phi_2) \qquad (6)'$$

The difference between the expressions (6) and (6)' is:

$$-(a - a') = +e(\phi_1 - \phi_2)/(\phi_1 + \phi_2 - e\phi_1\phi_2) \tag{9}$$

This difference is the variation of the object-to-image distance which is caused by interchanging $\phi_1$ and $\phi_2$.

If $\phi_1$ is positive and $\phi_2$ is negative, then $-(a-a')$ is positive (because the denominator of the expression (9) is the entire power and is positive). Therefore, when in a two-lens-group zoom lens system consisting of positive and negative lens groups, the front lens group has a positive power and the rear lens group has a negative power, the decreased distance, i.e. the difference between $-a$ and $-a'$, can be regarded as providing an additional space margin on the side of the object with the object-to-image distance maintained unchanged, when compared with a zoom lens system in which the front and rear lens groups have a negative power and a positive power respectively. This increased margin is enough to permit an adequate movement range of the half-speed mirrors.

Figure 7:
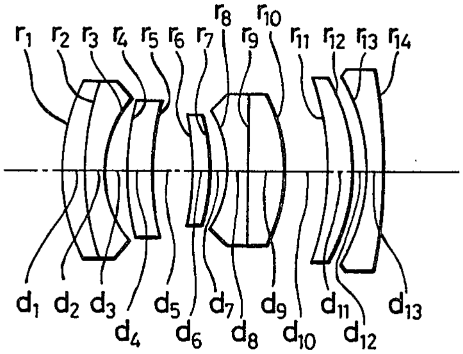
FIG. 7 is a sectional view of one example of the lens system according to this invention.

One example of the above-described zoom lens system is shown in FIG. 7. The zoom lens system is made up of a first lens group (or a front lens group) having a positive focal length and a second lens group (or a rear lens group) having a negative focal length, which are arranged in the stated order as viewed from the side of the original. That is, the zoom lens system is a variable magnification type copying lens system which can maintain constant the distance between an original's surface and an image plane by moving the entire system while varying the distance between the front and rear lens groups. The movement of the front lens group contributes to magnification variation, while the movement of the rear lens group contributes to the maintenance of the constant distance between the original's surface and the image plane. The front lens group is essentially of the type which is employed in single-focus copying lens systems. The front lens groups consists of a lens assembly obtained by joining a positive lens having a convex surface facing towards the original and a negative lens having a concave surface facing towards the image, a positive meniscus lens having a convex surface facing towards the original, a positive meniscus lens having a convex surface facing towards the image, a diaphragm being disposed between the two meniscus lenses, and a lens assembly obtained by joining a negative lens having a concave surface facing towards the original and a positive lens having a convex surface facing towards the image. These lenses are arranged in the stated order as viewed from the side of the original. On the other hand, the rear lens group consists of a positive meniscus lens having a convex surface facing towards the image and a negative meniscus lens having a concave surface facing towards the original, which are arranged in the stated order as viewed from the side of the original. Thus, the variable magnification type copying lens system having the above-described various lenses satisfies the following conditions:

$$\frac{M_{max}}{M_{min}} < 3.0$$

$$1.2 < \frac{|f_{II}|}{f_{max}} < 3.0 \; (f_{II} < 0)$$

$$0.02 \leqq \frac{\Delta D_{I,II}}{f_{max}} \leqq 0.20$$

$$0.10 \leqq \frac{|r_{IIP}|}{f_{max}} \leqq 0.30 \; (r_{IIP} < 0)$$

$$F_\infty = 5.6$$

$$f = 238.884 \sim 251.694$$

$$NA = 0.0544 \sim 0.0370$$

$$M = -0.64 \sim -1.41$$

$$\omega = 16.3°$$

where,

- $M_{max}$ is the magnification of the high magnification side (enlargement side) of the magnification variation range,
- $M_{min}$ is the magnification of the low magnification side (reduction side) of the magnification variation range,
- $M_{max}/M_{min}$ is the magnification variation ratio,
- $f_{max}$ is the focal length of the entire optical system in the unity magnification,
- $f_{II}$ is the focal length of the second lens group,
- $\Delta D_{I,II}$ is the amount of variation of the distance between the first and second lens groups, and
- $r_{II\,P}$ is the radius of curvature of the image side surface of the positive meniscus lens. More specifically, if it is assumed that r represents the radius of curvature, d a lens thickness or an air distance between lenses along a d-line through the lens centers, N the refractive index of the lens material with respect to the d-line, ν the Abbe number of the lens material, f the focal distance of the entire zoom optical system, $F_\infty$ the F number with respect to an object at an infinite distance, M the magnification, ω the half view angle of the main beam, and NA the numerical aperture ($NA = 1/(2F_\infty(1+|M|))$), then the following data are obtained:

| Lens Surface | r | d | N | ν |
|---|---|---|---|---|
| 1 | 60.078 | 7.49 | 1.69100 | 54.8 |
| 2 | 82.000 | 8.15 | 1.54072 | 47.2 |
| 3 | 41.500 | 4.56 | | |
| 4 | 64.838 | 10.62 | 1.65160 | 58.6 |
| 5 | 116.372 | 12.63 | | |
| 6 | −106.775 | 6.41 | 1.62041 | 60.3 |
| 7 | −56.405 | 3.64 | | |
| 8 | −40.196 | 8.83 | 1.60342 | 38.0 |
| 9 | −900.000 | 11.09 | 1.67790 | 55.3 |
| 10 | −52.200 | 5.30∼21.41 | | |
| 11 | −85.349 | 8.84 | 1.74950 | 35.3 |
| 12 | −53.858 | 5.47 | | |
| 13 | −52.200 | 5.00 | 1.78590 | 44.2 |
| 14 | −112.397 | | | |

$$\frac{M_{max}}{M_{min}} = 2.2$$

-continued $$\frac{|f_{II}|}{f_{max}} = 1.780$$

$$\frac{\Delta D_{I,II}}{f_{max}} = 0.064$$

$$\frac{|r_{IIP}|}{f_{max}} = 0.214$$

When the expression (9) is applied to this lens system, with the enlargement side M = −1.41X $$\phi_1 = 0.0059285$$

$$\phi_2 = -0.0022311$$

$$e = 30.258$$

Therefore, $$-(a-a') = 60.3 \text{ mm}$$

In practice, the optical system is a thick lens system in this embodiment. Therefore, in the case where the first lens group is a positive lens, the distance u between the object surface and the apex of the first lens group is 387.8 mm with the enlargement end M = −1.41X. In the case where the opposite lens system is employed, i.e. in the case where the first lens group is a negative lens, the distance u' between the object surface and the apex of the first lens group is 355.5 mm with the same enlargement end M = −1.41X. Therefore, (u−u') = 32.3 mm.

Thus, this additional space can be obtained owing to the effect of the invention. Since a certain amount of additional room can be obtained by merely using the conventionally available space more efficiently, the 32.3 mm advantage of this invention is sufficient to achieve free movement of the half-speed mirrors. However, it should be noted that the above-described zoom lens system is just one example and the invention is not limited thereto or thereby.

The variable magnification type optical copier according to the invention is designed as described above. Therefore, even in the case where the size of a copying image to be enlarged is close to the maximum original size of an optical copier, i.e. both the copying image size and the original size are large, with the copier according to this invention having the magnification varying device incorporating the above-described zoom lens system, the drawbacks accompanying the conventional optical copier can be eliminated, the image of the original can be formed fully over the width of the photo-sensitive drum, and the maximum original size and the maximum copy size can be most effectively utilized.

We claim:

1. In an optical copier of the type which is capable of both enlargement and reduction copying, said copier including a full speed mirror for scanning an original document, a zoom lens system consisting of only two relatively movable lens groups, said two relatively movable lens groups consisting of front and rear lens groups as viewed from the side of said original document, said zoom lens being movable along an optical path extending from said original document to a photo-sensitive drum for adjusting the magnification ratio of said copier, and half-speed mirrors disposed in said optical path between said full-speed mirror and zoom lens system and movable toward and away from said zoom lens system, the improvement characterized in that:

the scanning moving region of said half-speed mirrors during unity and reduction magnification copying is overlapped with the moving region of said zoom lens system during enlargement copying;

said front lens group has a positive focal length; and said rear lens group has a negative focal length.

2. The optical copier as claimed in claim 1, wherein said zoom lens system satisfies the following conditions:

$$\frac{M_{max}}{M_{min}} < 3.0$$

$$1.2 < \frac{|f_{II}|}{f_{max}} < 3.0 \quad (f_{II} < 0)$$

$$0.02 \leq \frac{\Delta D_{I,II}}{f_{max}} \leq 0.20$$

$$0.10 \leq \frac{|r_{IIP}|}{f_{max}} \leq 0.30 \quad (r_{IIP} < 0)$$

where $M_{max}$ is the magnification of the high magnification side (enlargement side) of the magnification variation range, $M_{min}$ is the magnification of the low magnification side (reduction side) of the magnification variation range, $M_{max}/M_{min}$ is the magnification variation ratio, $f_{max}$ is the focal length of the entire optical system in the unity magnification, $f_{II}$ is the focal length of the second lens group, $\Delta D_{I,II}$ is the amount of variation of the distance between the first and second lens groups, and $r_{II\,P}$ is the radius of curvature of the image side surface of the positive meniscus lens.

3. The optical copier as claimed in claim 2, wherein said zoom lens system is defined by:

$$F_\infty = 5.6$$

$$f = 238.884 \sim 251.694$$

$$NA = 0.0544 \sim 0.0370$$

$$M = -0.64 \sim -1.41$$

$$\omega = 16.3°$$

| Lens Surface | r | d | N | ν |
|---|---|---|---|---|
| 1 | 60.078 | 7.49 | 1.69100 | 54.8 |
| 2 | 82.000 | 8.15 | 1.54072 | 47.2 |
| 3 | 41.500 | 4.56 | | |
| 4 | 64.838 | 10.62 | 1.65160 | 58.6 |
| 5 | 116.372 | 12.63 | | |
| 6 | −106.775 | 6.41 | 1.62041 | 60.3 |
| 7 | −56.405 | 3.64 | | |
| 8 | −40.196 | 8.83 | 1.60342 | 38.0 |
| 9 | −900.000 | 11.09 | 1.67790 | 55.3 |
| 10 | −52.200 | 5.30∼21.41 | | |
| 11 | −85.349 | 8.84 | 1.74950 | 35.3 |
| 12 | −53.858 | 5.47 | | |
| 13 | −52.200 | 5.00 | 1.78590 | 44.2 |
| 14 | −112.397 | | | |

$$\frac{M_{max}}{M_{min}} = 2.2$$

$$\frac{|f_{II}|}{f_{max}} = 1.780$$

$$\frac{\Delta D_{I,II}}{f_{max}} = 0.064$$

$$\frac{|r_{IIP}|}{f_{max}} = 0.214$$

where r represents the radius of curvature, d a lens thickness or an air distance between lenses along a d-line through the lens centers, N the refractive index of the lens material with respect to the d-line, ν the Abbe number of the lens material, f the focal distance of the entire zoom optical system, $F_\infty$ the F number with respect to an object at an infinite distance, M the magnification, ω the half view angle of the main beam, and NA the numerical aperture ($NA = 1/(2F_\infty(1+|M|))$).

* * * * *